Jan. 6, 1970  R. E. PAULSON  3,487,931
FILTER UNIT WITH REMOVABLE SELF-CLEANING SCREEN SECTION
Filed March 6, 1968

INVENTOR:
Rueben E. Paulson

BY: *James R. Hoatson, Jr.*
*Philip T. Liggett*
ATTORNEYS

United States Patent Office 3,487,931
Patented Jan. 6, 1970

3,487,931
FILTER UNIT WITH REMOVABLE SELF-CLEANING SCREEN SECTION
Rueben E. Paulson, Fridley, Minn., assignor to Universal Oil Products Company, Des Plaines, Ill., a corporation of Delaware
Filed Mar. 6, 1968, Ser. No. 711,031
Int. Cl. B01d 41/00
U.S. Cl. 210—130  5 Claims

ABSTRACT OF THE DISCLOSURE

A filter unit constructed to have a removable self-cleaning cylindrical form filter screen positioned above a removable dirt collecting bowl at the bottom of the unit, with a preferred embodiment having the screen fabricated of wedge-shaped rod to in turn provide a continuous slotted opening which is of an inverted V-shape increasing in size in the direction of fluid flow. A preferred embodiment also uses a spring biased thermal bypass valve in a bypass section in a manner whereby either a predetermined high temperature or excessive pressure will effect a valve opening and a fluid bypassing of the filter screen.

---

The present invention relates to an improved type of filter unit with a removable dirt bowl section and a removable internal self-cleaning screen section. More particularly, the screen section is cylindrical and of the slotted-type formed from the use of a wound wedge-shaped rod so that the resulting slot is of the nature of an inverted V so as to be self-cleaning for any particles which do pass therethrough.

There have been many types of filtering devices used in effecting a myriad of filtering operations; however, most types are not of a satisfactory self-cleaning nature and must be periodically serviced to effect the cleaning or replacement of the filter section. It may also be noted that while it is not unusual to make use of a cylindrical form of filter or screen section in the assembly, it is not conventional to have a centrifugal fluid inlet flow, such as provided by the present improved design, so that there may be a swirling flow around the entire surface of the screening section and enhanced particle separation.

Thus, in connection with the present invention, it may be considered a principal object to have centrifugal fluid flow around a cylindrical form of self-cleaning screen section, as well as removability for such section and a lower dirt collecting bowl.

A further object of the invention provides for the use of a "fail-safe" arrangement where a spring biased thermally sensitive bypass valve is positioned in a bypass passageway to permit flow around the screen in case either the fluid temperature or pressure reaches a predetermined limit. For example, where the filter unit may be utilized in a water cooling system for an engine and there is a resulting flow restriction from screen clogging and a temperature rise, then the bypass valve would be opened by virtue of the expansion action of the valve and flow permitted through a bypass channel. Further, if filter clogging is to the extent that there is differential pressure build-up within the device so as to reach a predetermined limit, governed by the biasing spring in the thermal bypass valve, then the valve could open in the manner of a "poppet valve" and permit flow through the bypass section.

Broadly, the present invention provides an improved filter assembly with removable dirt bowl and screen sections and comprises in combination, a housing having a fluid inlet, a fluid outlet, and a removable dirt bowl which is positioned to be on the lower portion of said housing when the latter is in operational position, an internal cylindrical form self-cleaning filter screen section removably mounted within said housing with its axis in vertical orientation above said dirt bowl and spaced from the housing wall to provide an annular separation space, internal passageway means from the interior of said filter screen to said fluid outlet, and tangential fluid passageway means from said fluid inlet of said housing to the annular section around said screen.

As noted hereinbefore, it is a particular feature of the preferred embodiment of the invention to form the self-cleaning filter screen section of triangularly-shaped, or of wedge-shaped, wire or rod and to wind such rod in a helical manner so that there is a resulting continuous slot which is of the nature of an inverted V in cross section. Thus, the slot diverges or increases in size in the direction of fluid flow. This arrangement, of course, provides for the free flow of any material or particles which once pass through the outer surface of the screen section. It may also be emphasized that it is a particular feature of the improved construction and arrangement to have the fluid inlet directed to the interior of the housing in a tangential manner so that the fluid flow swirls centrifugally around the outer periphery of the cylindrical form central section to in turn enhance the self-cleaning operation of the unit. The oversize particles which are to be removed from the fluid stream will pass to the lower end of the housing by gravity flow and be collected in a removable dirt bowl section.

In order to incorporate "fail safe" means within the filtering assembly, as also noted hereinbefore, there is provided a bypass arrangement whereby a thermally sensitive valve will open responsive to a temperature rise above a predetermined level, as well as have spring biasing means to permit the opening of the valve where there is a clogging of the filter causing a differential pressure reaching a predetermined limit. In order to provide a simplified construction with a single bypass passageway and a single valve, there may be incorporated as a part of the temperature sensitive valve a spring which is normally biasing the valve plate open but will operate in the manner of a "poppet" valve to permit the valve to be opened by a predetermined pressure exerted against the upstream face of the valve.

Reference to the accompanying drawing and the following description thereof will illustrate the construction and arrangement of one embodiment of the present improved invention and, in addition, will aid in pointing out the advantages of the removable self-cleaning filter section and the fluid bypass arrangements.

DESCRIPTION OF THE DRAWING

FIGURE 1 of the drawing is a sectional elevational view of a self-cleaning filter assembly, while

Figure 1:
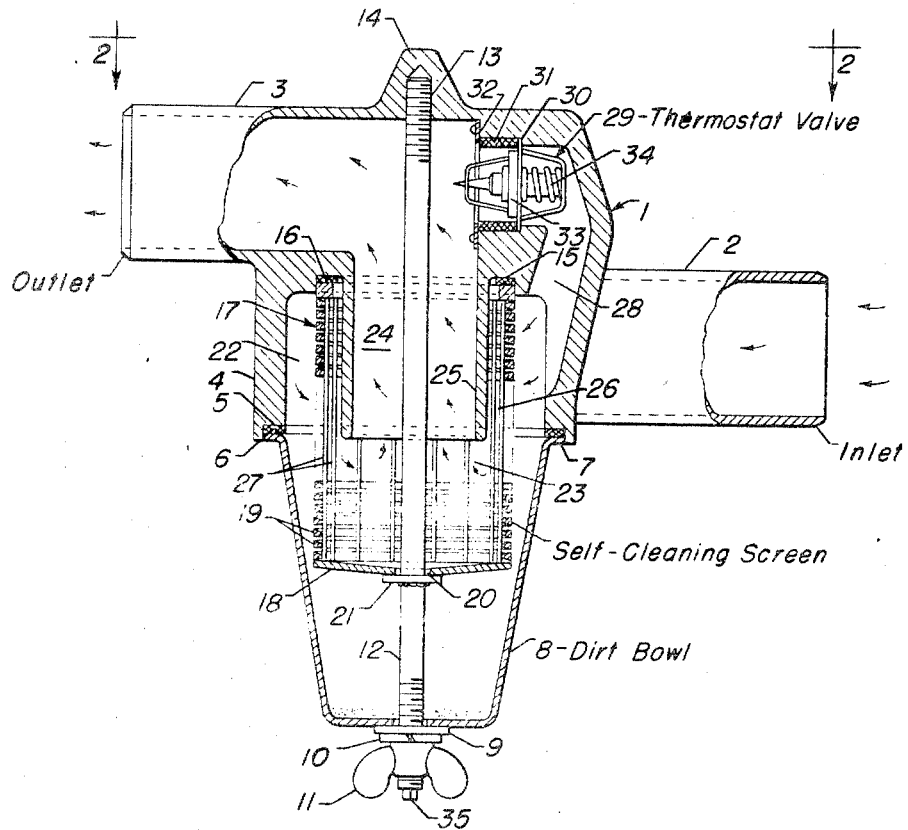

Referring now particularly to the drawing, there is shown a housing 1 with fluid inlet 2 and a fluid outlet 3 extending laterally therefrom. The lower portion of the housing is provided with a circular skirt section 4 which in turn is provided with a recessed section 5 adapted to hold a gasket 6 and a flange portion 7 of a removable dirt cup 8. In this embodiment, the dirt cup or bowl 8 is shown as being held in place by a gasket or seal means 9, a spring-washer 10 and a wing nut 11, which in turn is threadedly engaged with the end of a vertically oriented shaft or rod member 12. The latter has an interior end threaded at 13 and engaged with an interiorly tapped boss section 14 at the top of the housing 1.

Within the interior of the housing 1 there is provided a notched or recessed section 15 adapted to hold a gasket 16 and the end portion of a cylindrical-formed screen or filter section 17. The latter, in a preferred embodiment, is of a cylindrical or tubular form, as shown, having a non-perforate end plate 18 across the bottom end of slotted wall cylinder section 19. The plate 18 is provided with center hole or opening 20 so as to in turn provide a slip fit over the central rod member 12. A suitable ring or flange-like projection 21 on rod 12 is utilized to bear against the end of plate 18 to hold the entire filter section 17 within the recess 15 whereby there will be an out-to-in fluid flow through the slotted wall portion 19 into the interior of the housing 1. The incoming fluid flow is thus tangentially inward through inlet port 2 into an annular zone 22 where there is a resulting spiral or centrifugal flow around the outer face of filter 17 and then through slotted wall portion 19 into the interior section 23. From the latter zone, fluid flow is upward into passageway 24 and then outward from the fluid outlet port 3.

In a preferred construction and arrangement, there is an internal depending skirt or cylindrical baffle section 25 which defines passageway 24 as well as form an internal narrow annular passageway 26 with filter section 17 whereby fluid flow will be precluded from a short circuiting path through the upper portion of filter section 17 directly into the pasageway 24 and to the outlet port 3. In other words, the internal baffle section 25 insures a substantially uniform flow through the entire slotted portion of filter wall section 19 into the interior thereof and thence upwardly through the internal passageway 24 to outlet 3.

It will be noted that it is a particular feature of the improved assembly, as provided by the tangential fluid inlet means, 2 to have the outer section of the filter screen section 17 be spirally contacted by the fluid flow. Also, as pointed out hereinbefore, the preferred self-cleaning screen construction provides the wall surface 19 to be of a triangular or wedge-shaped wire wound over spaced apart longitudinal bars such as 27 whereby the filter open area is in the nature of a continuous slot which in turn is of the nature of an inverted V so as to diverge in cross-sectional area in the direction of inward fluid flow. Such arrangement provides the desired self-cleaning aspect whereby any particles which pass through the outer narrow slot portion will continue on through the entire filter assembly in a non-clogging manner. Those particles which fail to pass the slotted portion of the screen section 17 will fall into the lower portion of the dirt bowl 8 to be collected for periodic removal.

As an additional advantageous feature of a specific embodiment of the present invention, there is provided a fluid bypass by virtue of passageway means 28 extending upwardly from the annular zone 22 into contact with a thermostat valve arrangement 29. The latter is shown seated in a notch or shoulder section 30 within the interior of the housing 1 and a seal means 31 is held in place by a ring 32. The ring is indicated as being held in place by threaded cap screws; however, other suitable locking means may be used. In the event that the thermostat valve 29 has its valve plate 33 lifted by a temperature expansion action of spring 34 there will be a resulting bypass flow of fluid from passageway 28 directly into the interior of outlet port 3. It will also be noted in connection with the valve 29 that when installed so as to have the valve plate 33 in a downstream manner with respect to notched section 30 and spring 34, that such plate may be raised by a pressure action on the upstream face of plate 33 which is sufficient to flex the spring 34. This arrangement in effect provides a "fail-safe" arrangement for either high temperature condition or for an excessive pressure which may possible exist by virtue of a clogged screen within the filter assembly. Although it is believed that the present design, utilizing the vertically oriented self-cleaning type of screen in combination with the tangential centrifugal fluid inlet flow, will substantially eliminate any possibility of screen clogging, in the event that there is a lessening of fluid flow to the point that temperature may build up on the closed system, then the valve means 29 will open responsive to the thermal action of the valve or to the spring section and thus provide the safety aspects. It is to be noted that thermostat valves of various designs and constructions are readily available in the market and that they can be obtained to operate responsive to varying temperature ranges. At the same time, with a suitable design of the biasing spring as to size and length, there may be the combined provision of movement responsive to temperature differential and movement responsive to pressure differential. It is of course not intended to limit the present design and construction of the filter assembly to the use of any one exact design or type of thermostat valve although preferably it shall embody the aforedescribed spring action to permit operations responsive to temperature and/or pressure.

The location of the bypass channel means 28 and the thermostat valve location may also be varied within modified designs or embodiments of the housing 1; however, suitable access should desirably be provided for the removability of the thermostat valve. It may be noted in the present embodiment that there is alignment of the valve 29 with the outlet opening 3 such that it is readily installed or replaced without undue disassembly of the filter housing 1.

It is also a particular feature of the improved assembly and housing construction to permit easy removability of the internal self-cleaning screen section 17 in the event that it is to be inspected or possibly replaced. By having the screen assembly 17 in direct axial alignment with the removable lower dirt bowl section 8, there is provided easy access to such screen section. As is shown in the drawing, the utilization of the flange portion 21 on rod 12 will serve to clamp the screen section 17 in place against the gaskets 16 and in recess 15. For insurance of the tight engagement of screen section 17 within the interior of the assembly, there is indicated a flattened or squared end section 35 at the outer end of rod 12 whereby wrench means can effect the tightening of such rod 12 into the threaded section at boss 14. This arrangement then permits the lower removable dirt bowl section 8 to be slipped on and off of the rod end 12 without the removability of filter section 17. Thus, there may be ready inspection of the latter at such times as dirt particles are being removed from the interior of bowl 8.

Figure 2:
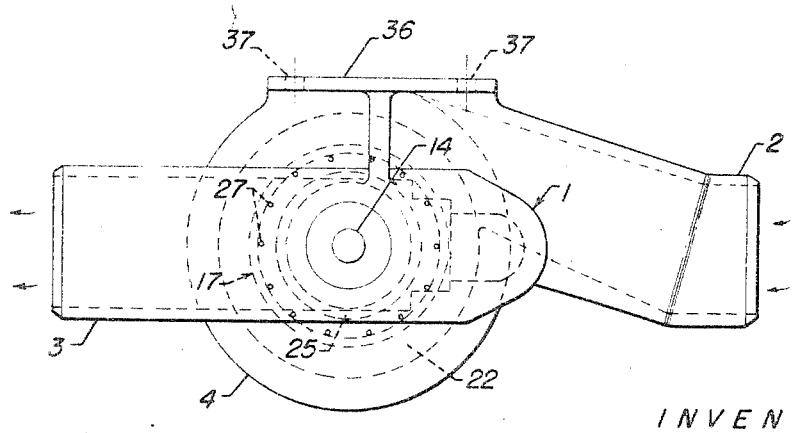
FIGURE 2 is a plan view of such assembly, as indicated by the line 2—2 in FIGURE 1.

As best shown in FIGURE 2 of the drawing, there is a suitable flat side section 36 to the housing 1 and holes 37 indicated through the face of such section whereby suitable cap screw means may be utilized to mount the entire filter assembly to a suitable engine block or other mounting plate. However, it is not intended to limit the present invention to any one particular method of mounting or to any one external configuration for the housing 1. For example, the inlet section 2 may be modified as to direction or orientation. Even though it is desired to maintain the tangential aspect with respect to the annular separation zone 22 around the face of screen section 17, the inlet port or nozzle may project at an angle upwardly or downwardly with respect to the centrifugal form screen section 17 and thus provide a resulting angular spiralling fluid flow across the outer face of the slotted type screen 17. Also, the fluid outlet 3 may be modified as to its orientation and need not be horizontal or lateral with respect to the vertical orientation of the filter screen section 17 and the cleaned fluid passageway 24. The dirt bowl section 8 may have a modified configuration but in a preferred arrangement is positioned at the lower portion of the entire assembly whereby gravity action will permit the non-disturbed accumulation of particles into a zone out of the direct turbulent flow. Still other modifications will be apparent to those skilled in the art of designing mechanical equipment of this nature without departing

I claim as my invention:

1. A fail-safe filter unit with removable dirt bowl and screen sections comprising in combination, a housing provided with a fluid inlet and outlet, said dirt bowl being positioned within the lower portion of said housing, an internal cylindrical self-cleaning filter screen section removably mounted within said housing in axial vertical orientation above said bowl to provide an annular separation space between said bowl and the wall of the housing, said screen section comprising a wedge-shaped rod wound around spaced longitudinal rod members to provide a V configuration enlarging in cross-section in the direction of fluid flow, internal passageway means from the interior of said filter screen to said fluid outlet, an internal bypass passageway within said housing communicating with said separation space, temperature and pressure responsive valve means in said passageway having a movable spring biased valve plate, said valve plate being positioned to open in a downstream direction responsive to predetermined pressure and temperature differentials, and tangential fluid passageway means from said fluid inlet of said housing to the annular section around said screen.

2. The filter unit of claim 1 further characterized in that said filter screen section has an end plate across one end thereof opposing an open end in turn adapted to fit within a seat portion of said housing and removable clamp means adapted to engage against said end plate and with a portion of said housing provides for holding said screen in place within the interior of said housing.

3. The filter unit of claim 1 further characterized in that separate removable clamping means holds said dirt bowl in a tight contact against seat means on said housing.

4. The filter unit of claim 1 further characterized in that a single axially positioned adjustably movable rod extends through said screen section and said dirt bowl, said screen section has a lower end plate with a center hole to accommodate said rod and said removable dirt bowl has an opening in the lower end portion thereof to slip fit over said axially positioned rod, an internally spaced flange on said rod effects clamping of said screen section and suitable clamping means threadedly engaged with the outer end of said rod holds said dirt bowl in a clamped position against seating means on said housing.

5. The filter unit of claim 1 further characterized in that an internal cylindrical baffle means extends downwardly into the interior of said filter screen section and is spaced a short distance from the interior wall thereof for at least a portion of the length of said cylindrical form filter screen section whereby the out to in fluid flow through the latter will be precluded from bypassing the lower surface of the screen section to directly enter the fluid outlet.

References Cited

UNITED STATES PATENTS

| | | | |
|---|---|---|---|
| 765,182 | 7/1904 | King | 210—497.1 |
| 1,107,485 | 8/1914 | Bowser | 210—304 |
| 1,176,732 | 3/1916 | Bowser | 210—304 |
| 1,822,006 | 9/1931 | Bull | 210—304 |
| 2,842,318 | 7/1958 | Campbell | 137—468 X |

FOREIGN PATENTS 507,078  11/1951  Belgium.

REUBEN FRIEDMAN, Primary Examiner

F. A. SPEAR, Jr., Assistant Examiner

U.S. Cl. X.R.

210—304, 497.1